US008519949B2

(12) United States Patent
Ross et al.

(10) Patent No.: US 8,519,949 B2
(45) Date of Patent: Aug. 27, 2013

(54) VIDEO PRODUCTION SWITCHER PANEL AND RELATED METHODS

(75) Inventors: David Allan Ross, Nepean (CA); Alun John Fryer, Richmond (CA); Troy David English, Ottawa (CA); Brian James Ford, Ottawa (CA); Kizito Gysbertus Antonius Van Asten, Kanata (CA); Julio Alberto Velandia Rodriguez, Ottawa (CA); Norman Wong, Ottawa (CA)

(73) Assignee: Ross Video | Live Production Technology, Nepean, Ontario (CA)

( * ) Notice: Subject to any disclaimer, the term of this patent is extended or adjusted under 35 U.S.C. 154(b) by 1452 days.

(21) Appl. No.: 12/100,629

(22) Filed: Apr. 10, 2008

(65) Prior Publication Data

US 2008/0252599 A1    Oct. 16, 2008

Related U.S. Application Data

(60) Provisional application No. 60/907,665, filed on Apr. 13, 2007.

(51) Int. Cl.
*G09G 5/00* (2006.01)
*G06F 3/02* (2006.01)
*G09G 3/36* (2006.01)
*G09G 5/10* (2006.01)

(52) U.S. Cl.
USPC ........... 345/156; 345/168; 345/170; 345/690; 345/102; 341/22

(58) Field of Classification Search
USPC ........... 345/102, 156–173, 204, 690; 341/22, 341/27
See application file for complete search history.

(56) References Cited

U.S. PATENT DOCUMENTS

| | | | | | |
|---|---|---|---|---|---|
| 4,755,072 | A | * | 7/1988 | Hoornweg | 400/490 |
| 5,557,300 | A | * | 9/1996 | Satoh | 345/170 |
| 7,417,624 | B2 | * | 8/2008 | Duff | 345/168 |
| 7,903,903 | B1 | * | 3/2011 | Acker et al. | 382/284 |
| 2002/0065054 | A1 | * | 5/2002 | Humphreys et al. | 455/90 |
| 2003/0011503 | A1 | * | 1/2003 | Levenson | 341/200 |
| 2005/0083306 | A1 | * | 4/2005 | Monary | 345/168 |
| 2006/0187236 | A1 | * | 8/2006 | Runnels et al. | 345/593 |
| 2008/0252664 | A1 | * | 10/2008 | Huang et al. | 345/690 |

* cited by examiner

*Primary Examiner* — Hong Zhou
(74) *Attorney, Agent, or Firm* — Nixon Peabody LLP; Jeffrey L. Costellia

(57) ABSTRACT

Various improvements for video production switchers are disclosed. In a user input module, a Link button is operable to link key functions with a user controllable input device. A multicolor lighting arrangement may be provided, and possibly calibrated, for illuminating each button of a switcher with a controllable color and/or intensity. In an improved Pulse-Width Modulation (PWM) scheme, a PWM output is dependent on a pseudo-random number and a threshold. A display on a keyer module may be used to provide indications of a key source and type currently associated with the keyer module. A switcher menu system may be enhanced by providing a first display for accessing a full menu system, and a second display for accessing at least a portion of the full menu system. In a modular switcher panel, a panel structure carries button modules, at least one of which is interchangeable without displacing other button modules.

12 Claims, 11 Drawing Sheets

VIDEO PRODUCTION SWITCHER PANEL AND RELATED METHODS

CROSS-REFERENCE TO RELATED APPLICATION

The present application claims the benefit of U.S. Provisional Patent Application Ser. No. 60/907,665, filed on Apr. 13, 2007, and entitled "VIDEO PRODUCTION SWITCHER PANEL", the entire contents of which are incorporated herein by reference.

FIELD OF THE INVENTION

This invention relates generally to the professional and broadcast audio/video production industry and in particular to tactile control panel surfaces.

BACKGROUND

Delegation of a Joystick

Video production switchers are capable of generating many effects and require a large number of parameters to be set and modified by the operator. A multi-axis joystick is a convenient way of adjusting these parameters. Traditionally the control panel surface of a video switcher has an area dedicated to the joystick and contains a large number of buttons and lamps. The buttons are used to delegate the joystick to control a single particular function. The lamps light to indicate which function is being controlled by the joystick.

Multiple functions may be delegated simultaneously by selecting multiple buttons. These multiple buttons may then illuminate simultaneously to indicate the functions being simultaneously controlled by the joystick. For a modern switcher with a large number of controllable items, an equally large number of buttons and lamps are required.

This approach has many drawbacks. A large amount of panel real estate is wasted in providing a button for each controllable function. It becomes impractical to provide a button for each function on the switcher that can be controlled by the joystick. This leads to buttons that serve dual purposes or functions that cannot be easily selected for control. Secondly, in live production situations where speed and accuracy of operation is critical, it can be difficult for the operator to quickly assess which function is being controlled by trying to identify a lit button or buttons in a large grouping of buttons. Dual-purpose buttons or functions without dedicated buttons complicate the matter and make it difficult to operate the joystick with certainty of which parts or characteristics of a video scene will be modified.

Identification of Button Groups on a Panel

On a control surface with a multitude of buttons and indicators, such as a production switcher panel, it is desirable to allow an operator to easily identify buttons and to logically group buttons having related functions, and do so quickly. This has been done using several methods.

Firstly, physical locations of buttons and button groups can delineate different functional areas of a control panel. For example, buttons for "keyer control" can be grouped together, and buttons for "memory" could be grouped in a separate area. This has the disadvantage that once the control panel has been designed, the groupings are fixed and do not allow for future functionality enhancement.

Colored button caps have also been used to delineate groups of related functions. This has similar disadvantages in that the colors are fixed and cannot be quickly changed. Additionally, the color choices are limited to those made by the manufacturer of the control panel and may not be aesthetically pleasing to the end user.

Another method to aid in the identification of buttons in a dark environment, such as a television control room, is the use of button illumination, using one or more light sources per button. This illumination may be used to highlight active functions or as an overall backlight to improve readability of button legends. Some implementations allow adjustment of button light source(s) brightness. This illumination is typically limited to one color, or a small number of color choices as dictated by the capabilities of the buttons' light source(s) and indicators installed on the control panel. This, disadvantageously, is limited to the color choices set out by the manufacturer and may not be aesthetically pleasing to the end user. It can also increase costs, because of the circuitry needed to drive each indicator independently.

Color Uniformity

Lighted indicators, such as Light Emitting Diodes (LEDs), are subject to variation by the nature of their manufacture. This can result in the unpleasant effect of low color uniformity, due not only to technological limitations of currently available light sources, but also to the sensitivity of human vision to detect subtle color differences, when many light sources with a similar but imperfectly matched color are lit, side-by-side. Using tighter color tolerance light sources is not a feasible option in many implementations, due to their higher cost and inherent limitations.

Uniform color and brightness of lighted indicators can also be significant for proper operation of a control panel. For example, a green indicator could indicate "All OK", whereas a yellow indicator might indicate "Caution". If the indicators are improperly calibrated, it is possible that an indicator which the panel had driven to be lit as green would actually appear yellow, resulting in an operator misinterpreting the indicator and not taking an appropriate action.

Control of Indicator Brightness Using Pulse-Width Modulation (PWM)

One common method of controlling the brightness of light sources such as LEDs is through the use of PWM, which is commonly known in the electronics industry. This method cycles the voltage or current feeding a light source ON and OFF rapidly to simplify the driver circuits. By varying the relative time the voltage or current is ON versus OFF, the human eye perception of brightness may be controlled. For example, a light source that is ON 100% of the time will appear to the human eye to be brighter than a light source that toggles quickly enough, and is ON for 50% of the time and OFF the other 50%.

Existing methods to generate PWM produce a waveform with a continuous ON time, and minimum transitions per cycle. Once a light source is turned ON, a monotonic digital counter will turn it OFF at a pre-programmed point in time during the cycle. This allows the perceived brightness of the light source to be varied by manipulating the amount of "ON time" versus "OFF time".

One disadvantage of this scheme is the PWM frequency has to be quite high (more than 200 Hz) to prevent discomfort to the human eye (a subtle "flicker", particularly noticeable when many light sources located sided by side are turned ON and OFF at the same time). One approach to reduce this effect is to increase the refresh frequency, but this makes the control and power circuitry more complex and expensive. Another option trades off refresh frequency for PWM resolution (the minimum ON time change possible, given the size and increment step of the counter).

Identification of Key Types

One of the primary features of a switcher is called a keyer. A keyer layers one piece of video, called a key, on top of another. A good example of this is the placement of the name of a newscaster on top of live video of that newscaster. There are several different types of keys, including linear, luminance, auto select, chroma, Preset Pattern, and Over The Shoulder (OTS) boxes, for example. The operator of a switcher panel or switcher chooses which type of key is to be used. The operator may have many keys available for use simultaneously, often more than 12. It is very important for the operator to be able to quickly verify that the correct key type has been selected on every keyer.

Switchers have one button per key type selectable on the control panel for a selected keyer. One and only one of these buttons will be lit at any time showing the currently selected key type. Pressing another key type button changes the key type to the new selection and lights that button.

Given a large panel with many keys and many key types, it is both space and cost prohibitive to provide one button per keyer per type. For example, a switcher with 12 keyers that each support 5 key types would require 60 buttons in this configuration. Switchers often place one set of key type buttons beside a set of buttons to select the keyer to modify. This reduces the number of buttons required but only allows the user to see the key type state for one keyer at a time. Verifying that all key types are correct would require 12 button presses in the case of a 12 keyer switcher.

Graphic Display

Almost all switchers have a large graphical display to assist the operator in using the product. These displays provide access to menus, one at a time, that show the state of controls as well as allowing the user to change these values. Since switchers are often used in a very fast live environment, every second counts for an operator. A menu that is currently being displayed on a switcher is chosen in one of two ways. A menu might be explicitly chosen by the user, sometimes through several button presses for navigating a menu tree. Alternatively, by pressing certain buttons on the main control panel surface, a user may cause, as a secondary effect from the button being pressed, the display to load a particular menu.

Fixed Panel Layout

Traditional switcher panels tend to be designed without flexibility in mind. Once the product is available to the customers, the form-fit of the control panel is fixed. If a customer wants the arrangement to be slightly different, the entire panel will have to be re-designed.

SUMMARY OF THE INVENTION

Thus, there remains a need for improved apparatus and methods relating to various aspects of video production and video production switcher panels.

According to an aspect of the invention, there is provided a module for a video production switcher panel. The module includes a user controllable input device, and a single Link button operable to link one or more of a plurality of key functions of the video production switcher panel with the user controllable input device. The user controllable input device is operable to control the one or more linked functions of the video production switcher panel.

The user controllable input device may include one or more of: a joystick, a mouse, a trackball, a keypad, a touchpad, a knob, 3D gloves, 3D knobs, a barcode reader, and a Radio Frequency Identification (RFID) reader.

In some embodiments, the one or more key functions comprise functions that are accessible through respective further buttons provided on the video production switcher panel.

The module may also include a display for providing an indication of the one or more linked functions.

In some embodiments, the module includes a Clear button operable to release the one or more linked functions from control by the user controllable input device. A Lock button may be provided to prevent automatic delegation of the user controllable input device after the one or more functions have been linked with the user controllable input device.

According to another aspect of the invention, a video production switcher panel includes a plurality of user operable buttons, a respective multicolor lighting arrangement operable to illuminate each button of the plurality of buttons, and a controller operable to control at least one of a color and an intensity of each multicolor lighting arrangement.

Each multicolor lighting arrangement may include independently controllable red, green and blue Light Emitting Diodes (LEDs).

In some embodiments, the controller is operable to illuminate groups of the buttons in respective unique colors.

The controller is implemented in software in some embodiments.

The video production switcher panel may also include a user input device for receiving from a user a selection of the at least one of a color and an intensity of each multicolor lighting arrangement.

Respective covers releasably secured to one or more of the buttons may also be provided, with each cover having a structure for providing a tactile indication of a delineation between groups of the buttons. The structure may be a dimple on the button cover, for instance.

The plurality of buttons may include calibrated buttons for which the multicolor lighting arrangement has been calibrated. In this case, the controller may be operable to control at least one of a color and an intensity of the multicolor lighting arrangement of each of the calibrated buttons by driving the multicolor lighting arrangement based on its calibration.

Where the plurality of buttons include calibrated buttons of a button module, which further includes a memory for storing calibration data associated with the multicolor lighting arrangement of each calibrated button, the controller may be operable to control at least one of a color and an intensity of each multicolor lighting arrangement by accessing the calibration data stored in the memory and driving the multicolor lighting arrangement based on its calibration.

Another aspect of the invention provides apparatus that includes an illumination driver that drives a plurality of light sources under common driving conditions, and a calibration data generator that receives illumination data associated with the plurality of light sources driven by the illumination driver and generates calibration data for the plurality of light sources based on the received illumination data.

The apparatus may also include a capturing device, operatively coupled to the calibration data generator, that captures the illumination data and provides the captured illumination data to the calibration data generator.

The capturing device may be one or more of: a digital camera, a video camera, a scanner, and discrete color sensors, for example.

In some embodiments, the plurality of light sources includes sets of light sources in respective multicolor lighting arrangements for illuminating buttons of a video production switcher panel button module. If the button module further includes a button module controller for controlling the multicolor lighting arrangements, the illumination driver may drive the plurality of light sources indirectly through the button module controller. The button module may also include a memory, in which case the calibration data generator may write the generated calibration data to the memory.

Such an apparatus could be implemented, for example, in a video production switcher panel that also includes the plurality of light sources, and an illumination controller, operatively coupled to the plurality of light sources, that drives each light source according to its calibration data generated by the calibration data generator.

According to yet another aspect of the invention, a method involves driving a plurality of light sources under common driving conditions, capturing illumination data associated with the plurality of driven light sources, and generating calibration data for the plurality of light sources based on the captured illumination data.

Capturing may involve capturing an image of the plurality of light sources.

In some embodiments, the plurality of light sources includes sets of light sources in respective multicolor lighting arrangements for illuminating buttons of a video production switcher panel button module, the button module further includes a memory, and the method also includes writing the generated calibration data to the memory.

The method may also include driving each light source of the plurality of light sources according to its calibration data.

Such a method may be implemented in instructions stored on a computer-readable medium, for instance.

A further aspect of the invention provides apparatus that includes a plurality of calibrated light sources, and an illumination controller, operatively coupled to the plurality of calibrated light sources, that determines calibration data associated with each light source and drives each light source according to its calibration data.

The plurality of calibrated light sources may include sets of light sources in respective multicolor lighting arrangements for illuminating buttons of a video production switcher panel button module. Where the button module further includes a button module controller for controlling the multicolor lighting arrangements, the illumination controller may drive each light source indirectly through the button module controller.

In some embodiments, the button module further includes a memory storing the calibration data, and the illumination controller determines calibration data by reading the stored calibration data from the memory.

The plurality of calibrated light sources may include sets of light sources in respective multicolor lighting arrangements, as noted above. The illumination controller may drive each light source in a group of the multicolor lighting arrangements by calculating amounts of compensation to apply to a driving parameter of each light source in the group to make the group display a target color, and driving each light source in the group based on a respective compensated driving parameter.

The set of light sources in each multicolor lighting arrangement may include a red light source, a green light source, and a blue light source, in which case the illumination controller may calculate the amounts of compensation for each multicolor lighting arrangement of the group by calculating respective scale factors for the green and blue light sources relative to the red light source, and apply the respective scale factors to the driving parameters of the green and blue light sources.

In some embodiments, the scale factors for the green and blue light sources are determined according to:

$$\alpha_{green} = \frac{G_{ideal}/R_{ideal}}{G_{measured}/R_{measured}},$$

$$\alpha_{blue} = \frac{B_{ideal}/R_{ideal}}{B_{measured}/R_{measured}},$$

where $\alpha_{green}$, $\alpha_{blue}$ are the scale factors for the green and blue light sources;

the calibration data comprises intensities $R_{measured}$, $G_{measured}$, $B_{measured}$ of the red, green, and blue light sources; and $R_{ideal}$, $G_{ideal}$, $B_{ideal}$ are intensities in which the red, green, and blue light sources are to be present to achieve the target color.

The apparatus may be implemented, for example, in a switcher panel, with the illumination controller being further operable to detect installation of the button module in the switcher panel.

A method according to a still further embodiment of the invention involves determining calibration data associated with each light source of a plurality of calibrated light sources, and driving each light source according to its calibration data.

The plurality of calibrated light sources may include sets of light sources in respective multicolor lighting arrangements for illuminating buttons of a video production switcher panel button module. Where the button module further includes a memory storing the calibration data, determining may involve reading the stored calibration data from the memory.

Driving may involve driving each light source in a group of the multicolor lighting arrangements by calculating amounts of compensation to apply to a driving parameter of each light source in the group to make the group display a target color, and driving each light source in the group based on a respective compensated driving parameter.

In some embodiments, the set of light sources in each multicolor lighting arrangement includes a red light source, a green light source, and a blue light source. Calculating may then involve calculating respective scale factors for the green and blue light sources relative to the red light source, and the method may further include applying the respective scale factors to the driving parameters of the green and blue light sources. The scale factors for the green and blue light sources may be determined as described above.

Another aspect of the invention provides an illuminated button module that includes a plurality of buttons, respective calibrated light sources that illuminate the plurality of buttons, and a memory storing calibration data associated with each calibrated light source.

There is also provided a Pulse-Width Modulation (PWM) controller that includes a pseudo-random number generator, and a comparator operatively coupled to the pseudo-random number generator and operable to compare a number output by the pseudo-random number generator with a threshold, and to provide an output at a first level or at a second level depending on the comparison.

The pseudo-random number generator may have a range, and be operable to output every number in the range once within a refresh cycle.

In some embodiments, the pseudo-random number generator is a Linear-Feedback Shift-Register (LFSR).

A PWM controller may be implemented, for example, in an LED driver, in which case the first level may cause an LED to turn ON, and the second level may cause the LED to turn OFF.

Such a PWM controller might also be implemented in a video production switcher panel, which includes a plurality of user operable buttons, an LED arrangement for illuminating each button of the plurality of buttons, and respective LED drivers operatively coupled the PWM controller and to each LED arrangement for driving each LED arrangement. The first level causes an LED driver to turn an LED ON, and the second level causes an LED driver to turn an LED OFF.

In some embodiments, the respective LED drivers are operatively coupled together in a chain, and the PWM controller is operatively coupled to the chain and operable to control the respective LED drivers.

A memory may also be provided in the video production switcher panel for storing respective thresholds for a plurality of brightness levels, in which case the PWM controller reads a threshold for each of the respective LED drivers from the memory.

In accordance with a further aspect of the invention, a keyer module for a video production switcher panel includes a display for providing an indication of a source of a key currently associated with the keyer and an indication of a type of the key.

The indication of the type of the key comprises an icon in some embodiments. A location of the icon in the display may be indicative of the type of the key.

According to yet another aspect of the invention, a video production switcher panel system includes a display having a first display for providing access to a full menu system of a video production switcher panel, and a second display area for providing access to at least a portion of the full menu system.

The first display area may incorporate user input devices, and the second display area may comprise duplicate user input devices associated with the portion of the full menu system to which the second display area provides access.

In some embodiments, the duplicate user input devices comprise programmable knobs.

The video production switcher panel may include one or more user input devices which, when operated, cause a menu change on at least one of the first display area and the second display area.

The first display area and the second display area may enable one or more of a copy function to copy a menu from one display area into the other display area, and a swap function to swap a menu between the two display areas.

At least one of the first display area and the second display area may also provide access to a user manual of the video production switcher panel.

A video production switcher panel is also provided, and includes a panel structure, and a plurality of button modules carried by the panel structure, at least one of the button modules being interchangeable in the panel structure without displacing other button modules in the panel structure.

The video production switcher panel may also include cables interconnecting the button modules, and a detector for detecting a type of each button module of the plurality of button modules. The detector is implemented in software in some embodiments.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Improved Delegation of Functions

Figure 1:
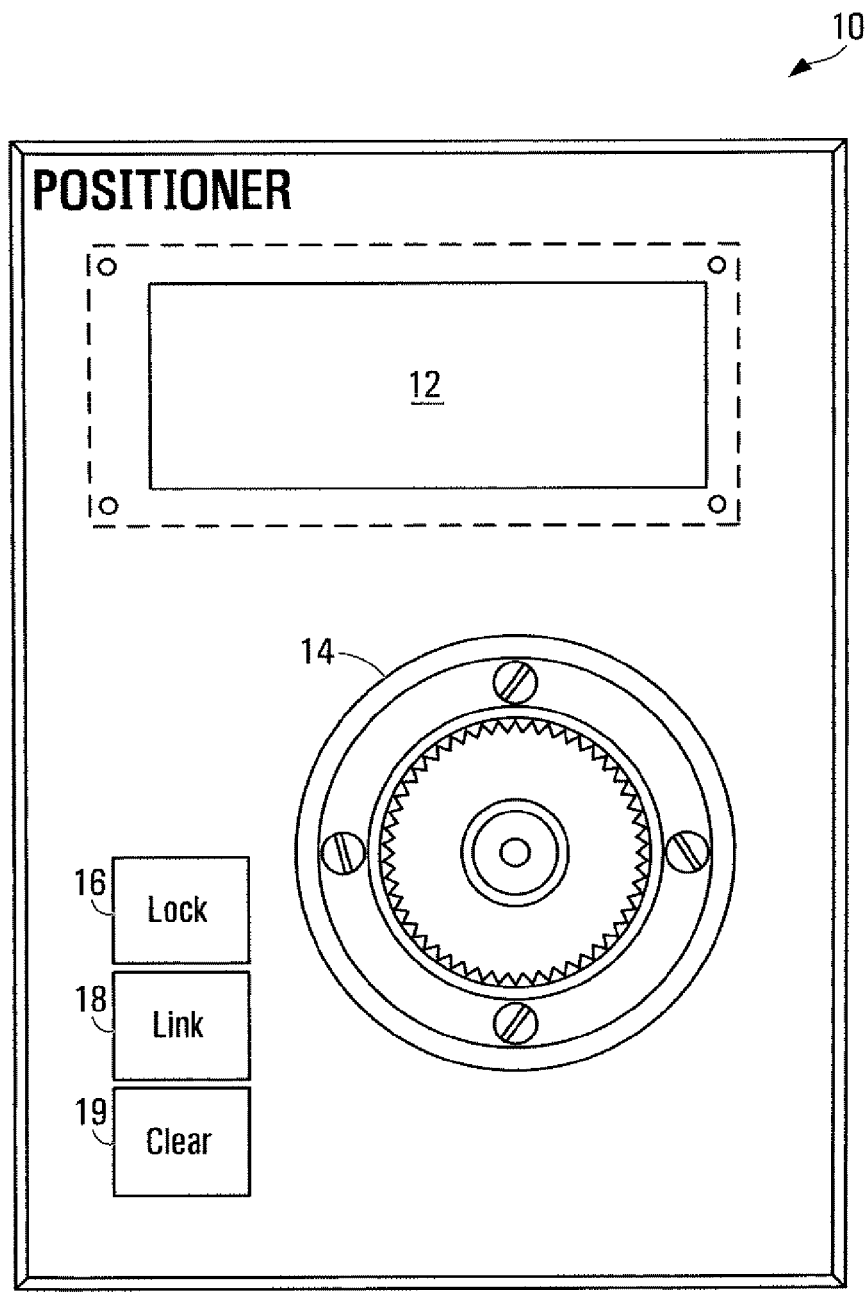
FIG. 1 shows an example of an enhanced user input device control area.

An example of an improved user input device control area is illustrated in FIG. 1. The example control area of a positioner 10 shown in FIG. 1 includes a status display 12, a Joystick 14 as an example of a user controllable input device, a Lock button 16, a Link button 18, and a Clear button 19.

It should be appreciated that the joystick 14 is shown in FIG. 1 solely for illustrative purposes. Other embodiments of the invention may be implemented in conjunction with different input devices, such as a mouse, a trackball, a keypad, a touchpad, knobs, 3D gloves, 3D knobs, a barcode reader, a Radio Frequency Identification (RFID) reader, etc.

Thus, the contents of FIG. 1, as well as all other Figures showing embodiments of the invention, are thus intended to be illustrative and not limiting. Embodiments of the invention may include further, fewer, or different elements, arranged and/or interconnected in a similar or different manner, than explicitly shown in the drawings.

According to an aspect of the invention, separate delegation buttons that might typically be found in a joystick control area have been replaced with the single Link button 18. This button can be used to provide the same functionality as multiple delegation buttons, as described below. The multi-line display 12 has also been incorporated into the positioner 10 control area, eliminating the need for lamps to display status.

To understand one method of operation of the joystick 14, a concept known as auto-follow is first described. A video switcher panel contains many buttons dedicated to performing specific functions. Many of these functions have parameters that are adjustable by the joystick 14. For example, performing a Fly Key will allow the joystick 14 to move or rotate an image on screen. When a Fly Key button (not shown) on a switcher panel is pressed, the joystick 14 will automatically switch to control the Fly Key operation. This eliminates the need for dedicated delegation buttons and saves time by not requiring the operator to hit multiple buttons to both enable a function and delegate control of it to the joystick 14. A joystick 14 that automatically changes its delegation based on other buttons being pressed leads to an increased need for quick and accurate display of what is currently being controlled.

One embodiment of the present invention uses the multi-line character display 12 to show textual information on the current joystick assignment. This replaces the status that was previously shown using lamps. The text display 12 is generally faster to read and provides more flexibility in the kind of information that can be displayed. For example, if the joystick 14 is delegated to controlling a Digital Video Effects (DVE) channel, the display 12 can indicate whether it is adjusting position or rotation. This information was previously not available within a joystick area and needed to be found elsewhere on a control panel. With the multitude of features available on today's video production switchers, the ability to display dynamic information provides feedback to the user that was not possible with the fixed nature of lamps.

The Link button 18 allows an operator to use the joystick 14 to control multiple functions at the same time. By holding down the Link button 18 and performing any other function, including but not necessarily limited to those that would normally auto-follow the joystick 14, the new function will be added to the list of current joystick-controlled functions. For example, if the joystick 14 is currently controlling the color of a background matte, and the operator holds the Link button 18 and presses a Fly Key button (not shown) on the control panel to which the positioner 10 is connected, the joystick 14 will then be controlling both of those functions (i.e., they are linked together). As the joystick 14 is moved, each function receives motion events from it, and performs the normal action for that function without knowledge that any other function is likewise being controlled. The link will persist until the joystick 14 is assigned to control another function or the link is explicitly cleared using the Clear button 19.

The actual manner in which motion events are provided to a control panel need not vary substantially from presently available switcher panels. Although embodiments of the invention provide a different mechanism for delegating functions to a joystick or other user controllable device, the operative coupling between such device and other components of a control panel may remain virtually the same. Once functions have been delegated to the joystick 14, for example, motion events may be provided to and processed by the switcher panel in much the same way as in conventional control panels, even though the functions were delegated in a different way, in accordance with an embodiment of the invention.

The status display 12 above the joystick 14 will indicate that multiple functions are linked together. A menu system can be used to display full details of all current links. It is possible for the operator to clear all links by holding the Link button 18 and pressing the Clear button 19 in some embodiments. In theory there is no limit to the number of functions that can be linked to the joystick 14, although an operator of a switcher panel may decide on a practical or manageable limit.

Embodiments of this invention can thus provide capabilities that were not possible in the past, such as adjusting the position and rotation of an image at the same time.

The positioner 10 control area also includes a Lock button 16. The Lock button 16 is used to prevent an auto-follow function from changing the current joystick delegation. This is especially useful when multiple links have been set up and the operator does not want them to change when another function that would normally take control of the joystick 14 is performed. It is also possible to lock the joystick 14 when it has no control of any function. This gives the operator peace of mind that bumping or moving the joystick 14 will not make any changes to any system parameters.

Thus, in summary, a module for a video production switcher panel may include a user controllable input device, the joystick 14 in the example 10, and a single Link button 18 that is operable to link one or more key functions of the video production switcher panel with the user controllable input device.

Improved Identification of Button Groups on a Panel

One method of button illumination according to another aspect of the invention is referred to as "Themable Panel Glow", and improves on the existing approaches of button identification.

By use of independently controllable red, green and blue light sources such as LEDs underneath each button and indicator, each button and indicator may be independently illuminated in a unique color. This allows software, for example, to group related functions by illuminating them in a similar color. This also, advantageously, allows any grouping of functions to be achieved by simply providing software, for example, to control the desired groupings as desired. Colors and/or other characteristics such as illumination levels for button groups may be selectable by an operator through a user interface such as a menu system displayed on a touchscreen or other user interface device.

Some examples of groupings on a switcher control panel are as follows:
  Each Multi-Level Effects (MLE) or Mix-Effects (M/E) bank is grouped with a common color
  Each Crosspoint bus is grouped with a common color
  Related macro buttons are grouped with a common color
  Related input crosspoint buttons are grouped with a common color
  On-air items are highlighted in a specific color
  Disabled items are illuminated in a common color.

This approach advantageously allows colors to be selected by the user, and hence allows a color theme to be selected that is aesthetically pleasing by that user.

Figure 2:
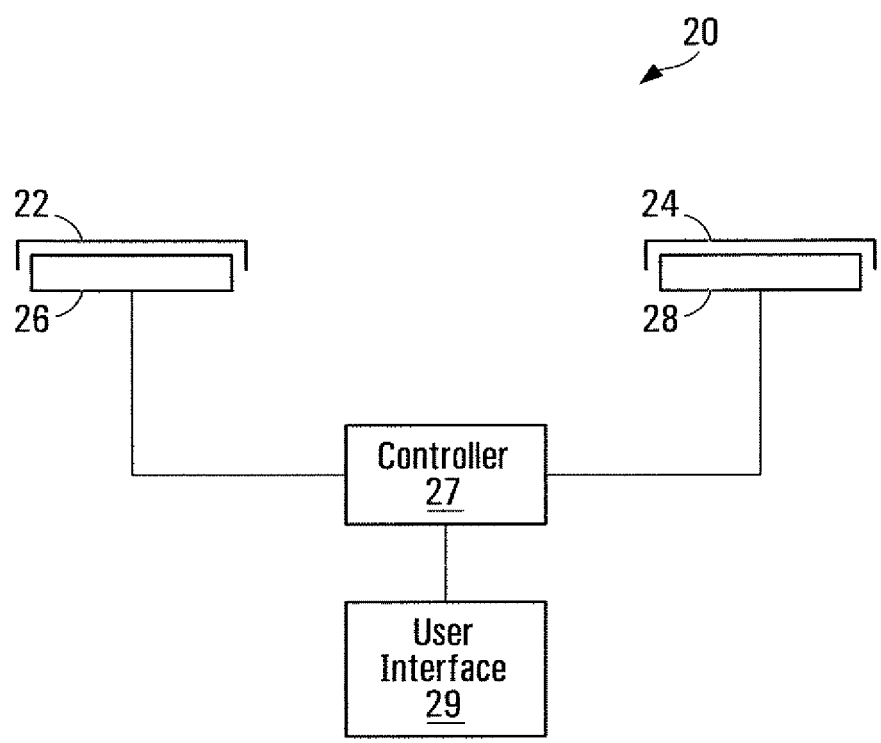
FIG. 2 is a block diagram of an example button group illumination control apparatus.

FIG. 2 is a block diagram of an example button group illumination control apparatus. The apparatus 20 includes button covers 22, 24, respective lighting arrangements 26, 28, a controller 27, and a user interface 29. All of these components may be implemented in a switcher panel. In some embodiments, the button covers 22, 24 and lighting arrangements 26, 28 are implemented in one or more button modules, and the controller 27 and the user interface 29 are implemented in a switcher panel in which the button module(s) may be installed. Although shown in FIG. 2 as a single block, functions of the controller 27 may be provided in multiple elements, such as a controller in a switcher panel and one or more button module controllers.

Those skilled in the art to which the present application pertains will be familiar with many types of illuminated buttons that are suitable for use in switcher panels. Illuminated button assemblies may include transparent or at least light transmissive button covers 22, 24 and lighting arrangements 26, 28. Although not explicitly shown in FIG. 2 to avoid overly complicating the drawing, a button assembly would also include some sort of switch below each button cover 22, 24, contacts or leads for connection to other switcher panel components, and possibly other elements involved in actual operation of the button to control functions of a switcher panel.

The lighting arrangements 26, 28 are multi-color sources in some embodiment, including red, green, and blue LEDs. Other types of light sources are also contemplated.

In some embodiments, the controller 27 is implemented in software for execution by one or more processing elements. Microprocessors, Application Specific Integrated Circuits (ASICs), Field Programmable Gate Arrays (FPGAs), and Programmable Logic Devices (PLDs) are examples of such processing elements. The controller 27, more generally, may be implemented using hardware, software, firmware, or combinations thereof.

The user interface 29 is intended to represent one or more devices for at least accepting user inputs. Examples include a keyboard, a pointing device such as a mouse, and a combined input/output device such as a touchscreen.

In operation, an operator may select or otherwise enter desired group settings, including the groupings and respective colors and/or illumination levels for the groupings, through the user interface 29. The controller 27 drives the lighting arrangements 26, 28 in accordance with the operator's entered group settings. The groupings of the buttons will then be illuminated on the panel with different colors and/or illumination levels.

Another possible form of delineation between groups of buttons would be removable button covers 22, 24. Button covers having structures for providing a tactile indication of a delineation between groups could be releasably secured to one or more buttons of a switcher, for example. Dimpled button covers could be placed on the first and/or last buttons in columns of buttons that control the same types of inputs, for instance, to separate live camera inputs from stored inputs.

Thus, button covers including some sort of tactile indication could replace or be installed over standard button covers 22, 24 at button grouping delineation points. The tactile button covers might be releasably secured to buttons through a friction fit or other means.

Thus, as will be apparent from FIG. 2, a video production switcher panel may include user operable buttons, a multi-color lighting arrangement 26, 28 operable to illuminate each button, and a controller 27 operable to control at least one of a color and an intensity of each multicolor lighting arrangement. Respective covers 22,24 may be releasably secured to one or more of the buttons, and in some embodiments the button covers include structures for providing a tactile indication of a delineation between groups of the buttons.

Color Matching

A further aspect of the invention provides a cost effective and flexible mechanism to analyze a set of multiple light sources, such as those in a button module for instance, and to compensate for color variations. Such variations are sometimes perceived when many multicolor buttons are lit side by side, using a dedicated set of red/green/blue light sources (such as LEDs) to independently illuminate each button.

Figure 3:
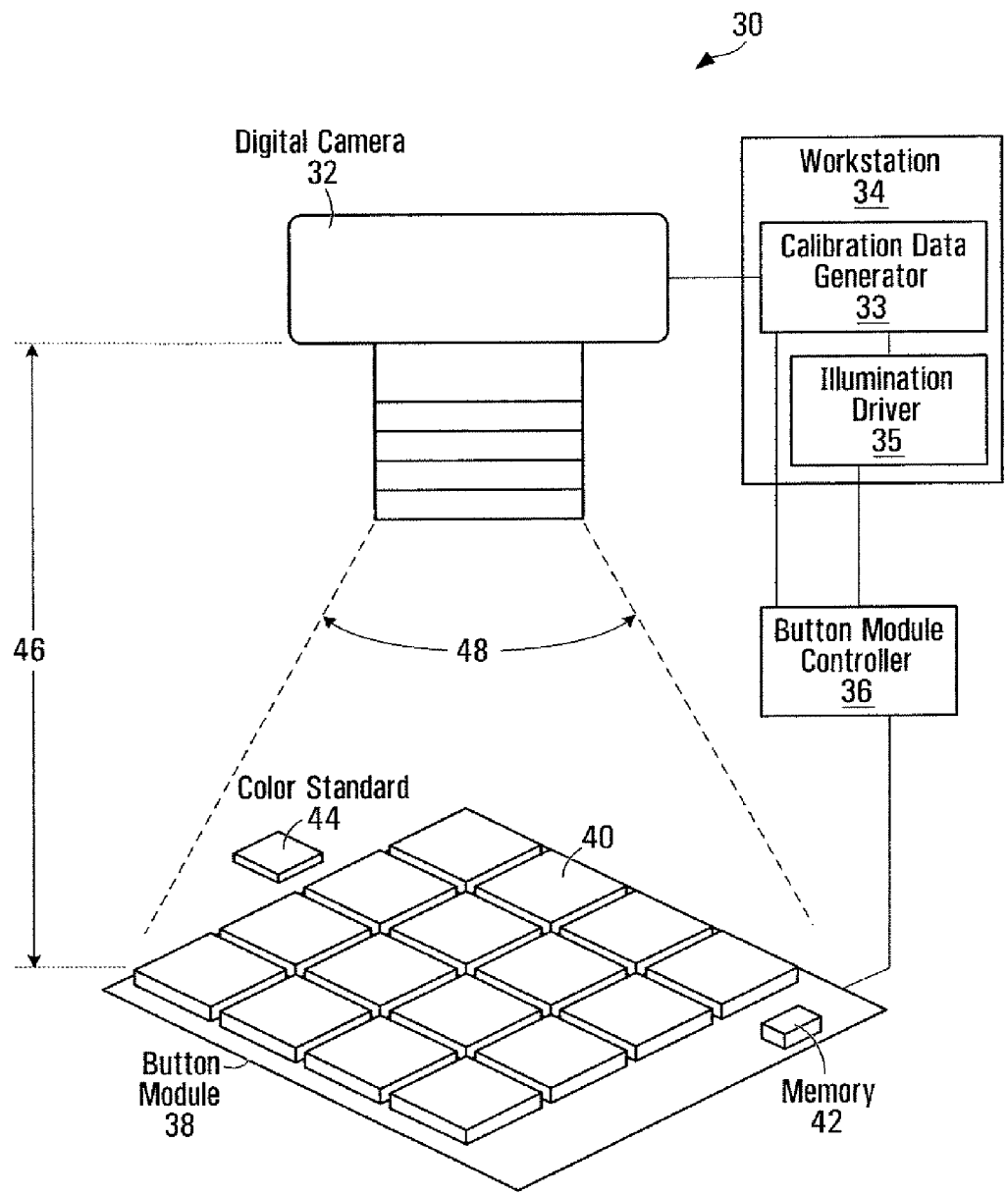
FIG. 3 is a block diagram of a light source calibration system according to another embodiment of the invention.

FIG. 3 is a block diagram of a light source calibration system according to another embodiment of the invention. The system 30 includes a digital camera 32, a workstation 34 operatively coupled to the digital camera, and a button module controller 36 operatively coupled to the workstation and to a button module 38. The workstation 34 includes a calibration data generator 33 and an illumination driver 35 operatively coupled to each other and to the button module controller 36. The calibration data generator 33 is also operatively coupled to the digital camera 32. The button module 38 includes a plurality of illuminated buttons 40 and a memory 42. A color standard 44 is also provided.

The digital camera 32 is an example of an illumination sensor or capturing device for sensing and capturing the level and/or color of illumination of the buttons 40 of the button module 38. Other types of color and/or intensity sensitive instruments may be used instead of a digital camera, such as a video camera or discrete color sensors, for example.

As shown, the calibration data generator 33 and the illumination driver 35 may be implemented in a workstation 34 in one embodiment. More generally, these components may be provided in software, hardware, firmware, or combinations thereof.

The button module controller 36 may similarly be implemented in software, hardware, and/or firmware, and in the example shown controls illumination of all of the buttons 40 of the button module 38. Where each button 40 includes multiple light sources, such as red, green, and blue LEDs, each light source may be controlled individually to provide any of various colors and intensities for illuminating the buttons.

In the system 30, the button module 38 includes sixteen illuminated buttons 40 and a memory 42, all of which may be installed on a single button module Printed Circuit Board (PCB) in some embodiments. The specific number of buttons provided in a button module may of course vary between different embodiments of the invention. Those skilled in the art will be familiar with many types of illuminated button assemblies. Any of many different types of memory devices may similarly be used to implement the memory 42, although a solid state memory device might be most appropriate for this purpose. For example, the memory 42 is an Electrically Erasable Programmable Read Only Memory (EEPROM) device in one embodiment. Other types of memory devices may also or instead be used.

The color standard 44 may be implemented, for example, as one or more light sources, which may or may not be the same type as those provided in the buttons 40 of the button module 38.

In operation, after manufacturing and possibly testing of the button module 38, the buttons 40 of the button module are driven by the illumination driver 35 under common driving conditions. According to one embodiment, each button 40 includes one red light source, one green light source, and one blue light source, and all of these light sources are driven using the same PWM settings. All of the buttons 40 of the button module 38 may be calibrated at the same time by driving the light sources of all of the buttons simultaneously, although it is also possible to drive the light sources of only a subset of the buttons at any time.

A capturing device or illumination sensor that is sensitive to one or more of color and intensity, and may be a high-resolution device such as the digital camera 32 in the system 30, captures illumination data under standardized capture conditions. In the case of the digital camera 32, illumination data capturing involves taking a picture of the illuminated buttons 40 of the button module 38. The capture conditions under which illumination data is captured may include any or all of aperture, lens model, focal distance, sensitivity, exposure time, noise reduction settings, ambient lighting, camera to button module distance 46, button module position in the field of view 48 of the camera, etc., and may be controlled, for example, by a specialized software application running in the workstation 34. Capture control functions may be integrated into the calibration data generator 33 or provided separately.

The calibration data generator 33 of the workstation 34 receives the picture, or more generally captured illumination data, from the digital camera 32. The illumination data is in the form of a picture in RAW format in one embodiment. The received illumination data, an image in this example, is processed by the calibration data generator 33 to determine the location and color composition of every lit button 40 in the image. Determining color composition in the case of multicolor light sources might involve determining the relative brightness of the related red, green, and blue light sources, for example. At least the measured relative brightness of each light source for each button is written into the memory 42 as calibration data by the calibration data generator 33, through the button module controller 36 in the example shown.

In some embodiments, red is selected as a reference color for the purposes of calibration and adjusted driving, as described in further detail below. Other colors or a separate emissive color standard 44, photographed at the same time as the button module 38, could be selected as a reference as well, with its illumination data also being processed to generate reference calibration data to be written to the memory 42.

Other information might also be included in the calibration data that is written to the memory 42 by the calibration data generator 33. For example, the calibration data generator 33 might also determine the type of the button module 36, illustratively by receiving user inputs through a user interface of the workstation 34, and write an indication of the determined type to the memory 42. This might not be done, for example, where a type indicator is already stored in the memory 42 during manufacture or testing. An identifier of the digital camera 32, the driving conditions, and/or the capture conditions may also be included in the calibration data that is written to the memory 42 of the button module 38.

A calibration mechanism supported by the system 30 provides several key advantages. For example, all of the light sources in the button module 38 can be simultaneously calibrated, thereby dramatically reducing the processing time per module. In addition, common off the shelf image capture devices, such as digital cameras, video cameras, and scanners may be used to capture illumination data. Such a mechanism may also have a lower cost and higher speed than existing application specific discrete sensor arrays that typically include customized jigs with multiple sensors or fibers to carry light from each button into a common sensor.

Other advantages may also be inherent in light source calibration as disclosed herein. Conventional calibration techniques typically require manual inspection of indicators using some form of electronic sensor or even subjectively by eye. Manual or mechanical adjustment of light sources is then required on a per-unit basis to attempt to match the colors adequately. These methods are slow and error-prone. Embodiments of the present invention significantly improve upon such techniques by capturing illumination data and generating calibration data, and then electronically compensating for differences. This is much faster and much more accurate than previous techniques.

A further advantage is that subsets of a switcher panel can be calibrated independently. Smaller areas of buttons can be calibrated independently of other groups. Thus, when a complete switcher panel is assembled, the calibration of all indicators could have been previously completed, so that calibration of the entire panel is not required. This may be particularly advantageous, since a switcher panel may be very large, and accordingly it may be impractical to calibrate it all at once. Additionally, if a portion of the switcher panel fails, either in the factory or subsequently after being shipped to an end user, it is possible to replace a smaller subsection of the panel with a new, previously calibrated subsection.

The calibration techniques proposed herein also advantageously provide the ability to perform a diagnostic on a unit containing one or more indicators automatically. A software system employed in a calibration system, for example, can be programmed to reject indicators that are not functioning, or whose output light levels do not satisfy previously-determined acceptable criteria, such as overall brightness, or representation of a certain color range. This allows a single operation to calibrate indicators, verify the light outputs of the indicators, and verify the circuitry which drives the indicators in a single operation.

Variations of the example system 30 and the mechanism described above are contemplated. For example, although an image in RAW format is described above, other formats may instead be used. RAW and other "native" camera image formats may provide sufficient resolution of illumination data for subsequent generation of calibration data, and may also avoid interference from many post-processing options a digital camera typically has, which could bias capture results. In general, formats having high channel resolution (number of bits per primary color, R,G,B), illustratively 12 bits or higher, may provide better illumination data capture and calibration results, although other formats such as the Joint Photographic Experts Group (JPEG) format having only 8 bits per channel could potentially be used. Results for lower resolution formats might be improved through filtering and/or otherwise processing color information. Further possible illumination data formats include, for example, Tagged Image File Format (TIFF), Portable Network Graphics (PNG) format, and Graphic Interchange Format (GIF).

Thus, FIG. 3 represents one example of an apparatus that includes an illumination driver 35 that drives light sources under common driving conditions, and a calibration data generator that receives illumination data associated with the light sources driven by the illumination driver and generates calibration data for the light sources based on the received illumination data. A capturing device, in the form of the digital camera 32 in the example shown, captures the illumination data and provides the captured illumination data to the calibration data generator 33. In the case of the button module 38, the light sources may be arranged in sets of light sources in respective multicolor lighting arrangements for illuminating the buttons 40. Although indirect driving of the button light sources through the button module controller 36 is shown in FIG. 3, an illumination driver may drive light sources directly or through some other indirect mechanism.

Figure 4:
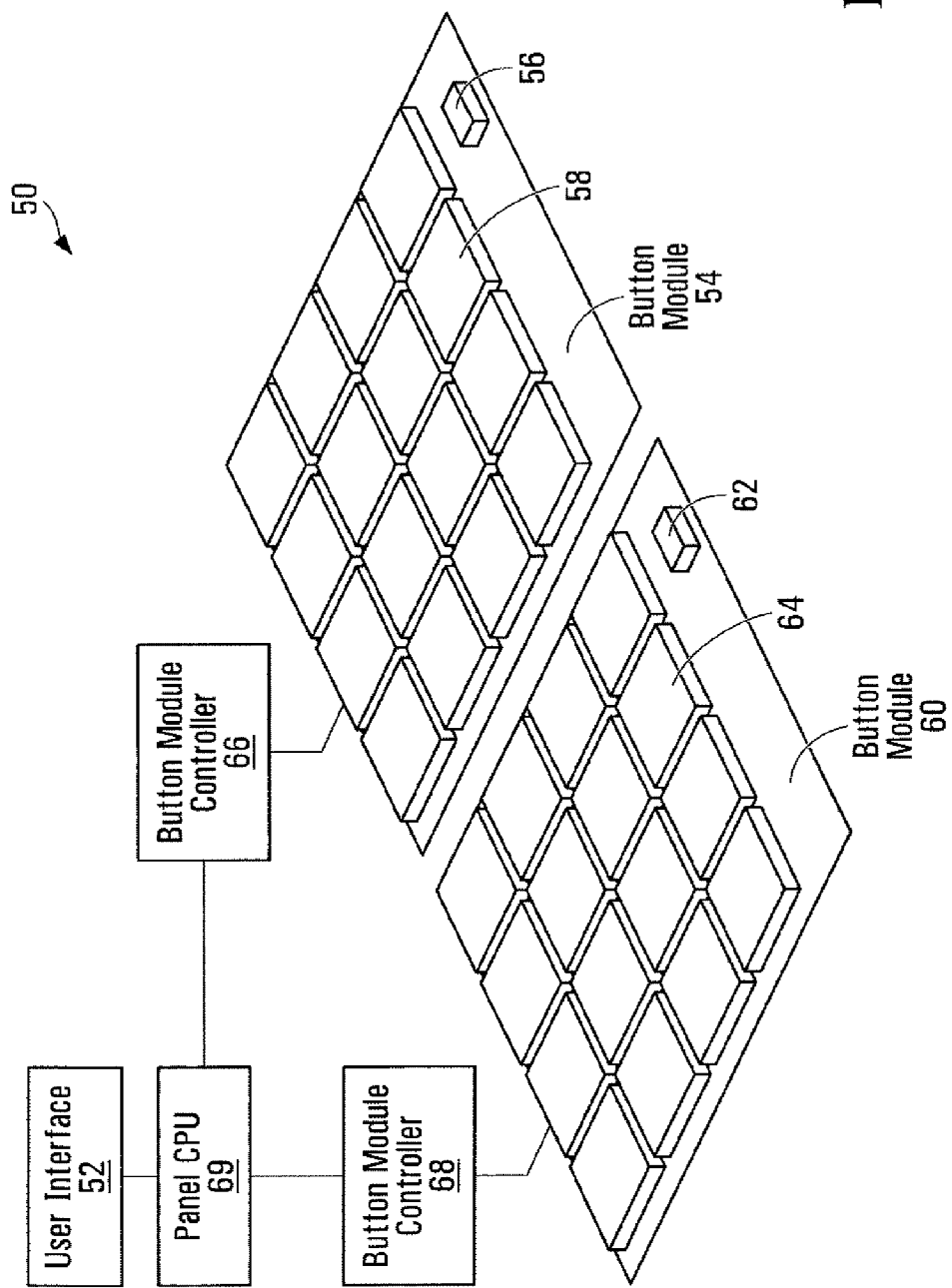
FIG. 4 is a block diagram of a system incorporating calibrated light sources, in accordance with a further embodiment of the invention.

FIG. 3 and the foregoing description thereof relate to calibration of button modules. FIG. 4 is a block diagram of a system incorporating calibrated light sources, in accordance with a further embodiment of the invention. The system 50 includes a user interface 52, multiple calibrated button modules 54, 60 with associated module controllers 66, 68, and a panel Central Processing Unit (CPU) 69 as an example of a component that could be used to implement an illumination controller. The panel CPU 69 is operatively coupled to the user interface 52 and to the button module controllers 66, 68, which are also operatively coupled to the button modules 54, 60. Each button module 54, 60 includes a memory 56, 62 and buttons 58, 64.

The user interface 52, like the user interface 29 (FIG. 2) may include one or more devices for receiving inputs from an operator and possibly also providing outputs to the operator. The button modules 54, 60 and the module controllers 66, 68 may be the same as the button module 38 and the button module controller 36 (FIG. 3), although calibration data would already have been written to the memory 56, 62 of each button module in the system 50.

The panel CPU 69 is intended to represent one possible implementation of an illumination control function. In many switcher panels, a panel controller is implemented using a CPU or other type of processor that may reside in the switcher panel itself or in an associated switcher frame. However, embodiments of the invention are in no way limited to this particular implementation of an illumination controller.

In FIG. 4, the panel CPU 69 automatically detects new button modules installed in a switcher panel. When a new button module 54, 60 is detected, the panel CPU 69 reads its calibration data from the memory 56, 62 via the module controller 66, 68. The set of light sources for each button 58, 64 can then be driven in accordance with its individual calibration data to provide consistent illumination across all buttons 58, 64 and all button modules 54, 60.

According to one embodiment, each button 58, 64 includes a set of red, green, and blue light sources, and the panel CPU 69 calculates green and blue scale factors for each button in each button module 64, 60. In the case of LEDs as the light sources, red LEDs tend to be the most reliable and stable, and for this reason only green and blue scale factors might be calculated in some embodiments. It should be appreciated, however, that the present invention is not in any way limited to adjusted driving of only a subset of a set of light sources. Individual driving conditions for all light sources in each set might be adjusted in other embodiments.

Green and blue scale factors could be determined according to Equation (1) below, for example:

$$\alpha_{green} = \frac{G_{ideal}/R_{ideal}}{G_{measured}/R_{measured}}, \quad (1)$$

$$\alpha_{blue} = \frac{B_{ideal}/R_{ideal}}{B_{measured}/R_{measured}},$$

where $\alpha_{green}$, $\alpha_{blue}$ are the green and blue scale factors;
$R_{measured}$, $G_{measured}$, $B_{measured}$ are the intensities of the red, green, and blue components measured during calibration; and
$R_{ideal}$, $G_{ideal}$, $B_{ideal}$ are the ideal intensities that the red, green, and blue light sources must be present in, to achieve a desired target color, illustratively a target white mixing ratio.

In the above example, the scale factors are determined to achieve a target white color. It should be appreciated, however, that any other target color could similarly be used as a basis for determining scale factors or other driving parameters for calibrated light sources.

When a software application being executed by the panel CPU 69 determines that a particular button should be lit with a color whose color components' relative intensities are (r, g, b), or an illumination color is selected or otherwise entered by an operator through the user interface 52, adjusted driving parameters are used. Equation (2) below provides examples of adjusted driving parameters:

$$g_o = \alpha_{green}*g, \; b_o = \alpha_{blue}*b, \; r_o = \alpha_{red}*r, \; \alpha_{red}=1. \quad (2)$$

Such parameters may be written as values in an LED brightness table in a button module controller 66, 68 that controls the button(s) 58, 64 to be illuminated, to compensate for differences among button lighting arrangements. The particular mechanism through which adjusted driving parameters are provided to calibrated light sources is implementation dependent. Brightness tables represent one possible light source driving mechanism. Embodiments of the invention may be implemented using other mechanisms as well.

The compensated relative intensities described above also represent one, but by no means the only, example of driving parameters that may be adjusted or compensated.

As noted above, red is selected as a reference color in some embodiments. Other colors or an emissive color standard 44 (FIG. 3) could instead be selected as a reference and used in determining red, green, and blue scale factors in a similar manner, although in this case the red scale factor might not necessarily be 1.

Scale factors and/or compensated driving parameters may be "pre-calculated" and stored by the panel CPU 69, when a button module 54, 60 is first detected for instance, or in real time when a button module is to be illuminated.

Since a button module memory 56, 62 stores calibration data based on measurement results, and not the scale factors or compensated driving parameters, a scaling or driving adjustment algorithm can be field updated over time to improve its performance.

For example, another algorithm might compensate only for brightness variations. In this case, the scale factors for each button ($\alpha_{red}$, $\alpha_{green}$, $\alpha_{blue}$) are chosen so that all light sources of the same type have the same relative brightness when a common driving input is used. The relative brightness might correspond to a selected standard such as 44 (FIG. 3) or to an idealized source (i.e., after calibration, all red light sources should read $R_0$, all green light sources should read $G_0$ and all blue light sources should read $B_0$, if ($i_r$, $i_g$, $i_b$) are used as inputs.

A further example would entail compensating for brightness variations on the red component, while keeping the desired color balance. In this case the per button coefficients or scale factors ($\alpha_{red}$, $\alpha_{green}$, $\alpha_{blue}$) would be multiplied by the ratio of an ideal relative brightness $Y_{ideal}$ to the measured relative brightness $Y_{measured}$ for that button. The "brightness" is a linear combination of that of each channel (R, G, B), as defined by the Society of Motion Picture and Television Engineers (SMPTE) in one embodiment.

In general, a compensation algorithm may be established and/or updated to accommodate a wide variety of target colors and intensities.

FIG. 4 thus represents an example of an apparatus that includes calibrated light sources, for illuminating the buttons 58, 64, and an illumination controller, in the form of the panel CPU 69, that determines calibration data associated with each light source and drives each light source according to its calibration data. The light sources in this example include sets of light sources in respective multicolor lighting arrangements. A group of the lighting arrangements can be driven by calculating amounts of compensation to apply to a driving parameter of each light source in the group to make the group display a target color, and driving each light source in the group based on a respective compensated driving parameter.

Although shown separately in FIGS. 3 and 4 and described separately above for the purposes of illustration, it should be appreciated that both calibration of button modules and use of calibrated button modules could potentially be supported in a switcher panel. Thus, in one embodiment, button modules are calibrated prior to assembly of a panel, and the panel enables multiple separately calibrated button modules to be used together to provide consistent panel illumination. Other embodiments in which the calibration mechanism is also supported in a panel could provide for periodic or on-demand field re-calibration of button modules to correct for color variations that may appear over time with ongoing use of button modules during operation of a panel. Thus, both a compensation algorithm and calibration data may be updated in the field.

Figure 5:
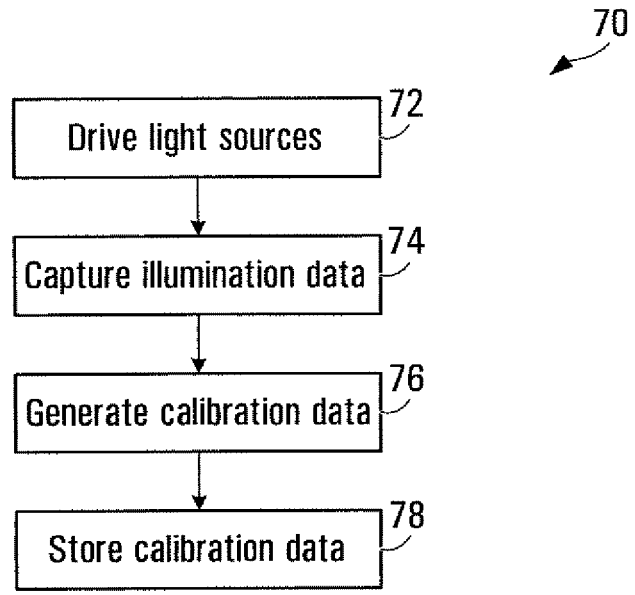
FIGS. 5 and 6 are flow diagrams illustrating methods relating to calibrated light sources.
Figure 6:
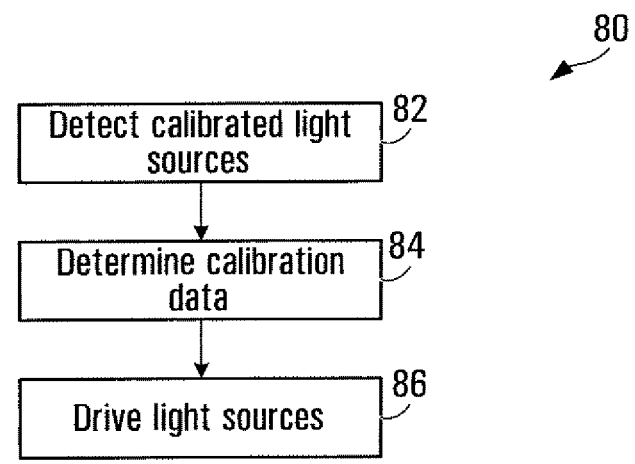

FIGS. 3 and 4 and the foregoing description relate to apparatus embodiments of calibration and compensation. Other embodiments are also contemplated. FIGS. 5 and 6, for example, are flow diagrams illustrating methods relating to calibrated light sources.

The calibration method 70 shown in FIG. 5 involves driving light sources at 72 under common driving conditions. Illumination data associated with the light sources is captured at 74, and calibration data for the light sources is generated based on the captured illumination data at 76. As shown at 78, the generated calibration data may be stored, in a memory of a button module for instance.

An example method of using calibrated light sources is shown in FIG. 6. The method 70 includes an operation of detecting calibrated light sources, when a button module is installed in a switcher panel, for example. Calibration data associated with each of the calibrated light sources is determined at 84, and each light source is driven at 86 according to its calibration data.

The methods 70, 80 are illustrative of embodiments of the invention. Other embodiments may include further or fewer operations than explicitly shown, which may be performed in a similar or different order. Variations of these methods may be or become apparent to those skilled in the art. At least some variations, including manners in which the operations shown in FIGS. 5 and 6 could be performed, will be readily apparent from FIGS. 3 and 4 and the corresponding descriptions thereof.

Improved Control of Light Source Brightness Using PWM

PWM flicker is a result of the eye's perception of the on-off cycling of a light source. As the cycle time increases (and the frequency decreases), the flicker becomes more apparent.

Figure 7:
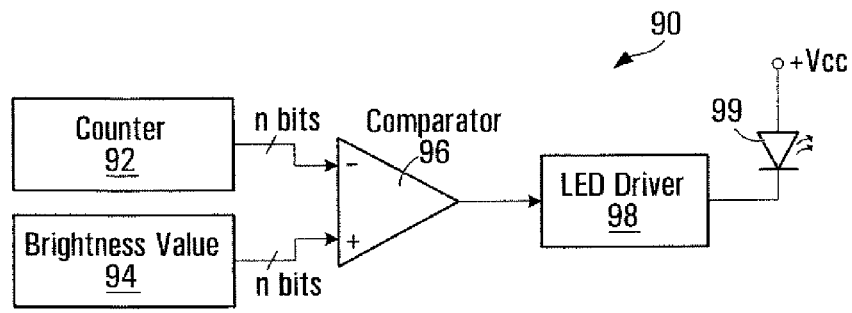
FIG. 7 is a block diagram of a conventional PWM controller.

FIG. 7 shows a typical PWM implementation 90, which includes a reference signal generator in the form of a binary counter 92 and a comparator 96 operatively coupled to the binary counter and to an LED driver 98. The binary counter 92 is used to count the full duration of a PWM cycle period. At the beginning of each PWM cycle, the LED 99 is turned ON by the LED driver 98, and when the value output by the counter 92 is greater than a threshold value 94 representing the desired brightness level, the LED is turned OFF. The ON/OFF decision is performed by the digital comparator 96.

Figure 8:
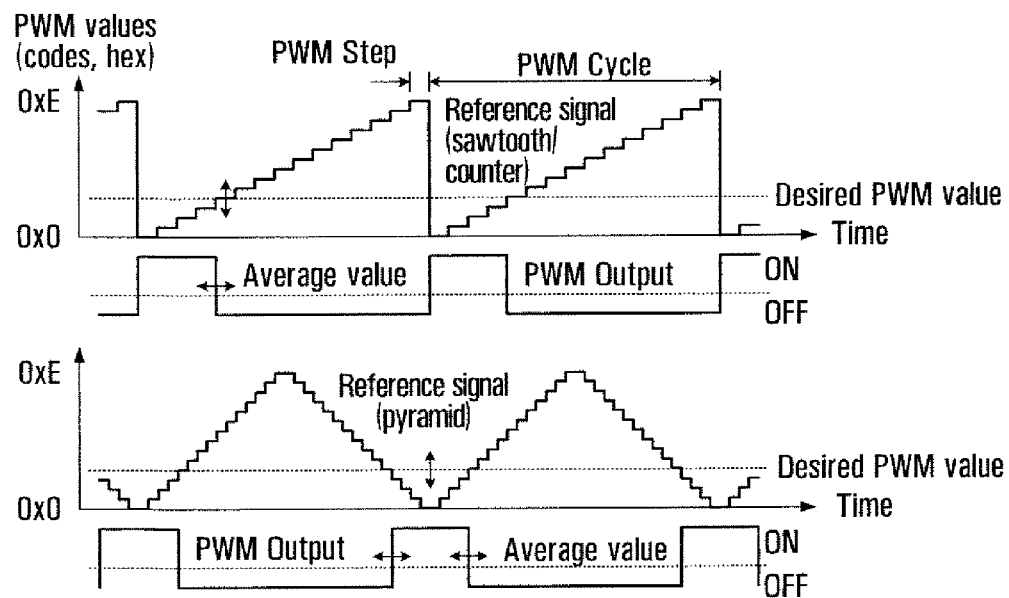
FIG. 8 shows example plots relating to PWM generation using a monotonic counter with 4 bits resolution.

Plots associated with this type of PWM control are shown in FIG. 8 for two different counter characteristics.

Figure 9:
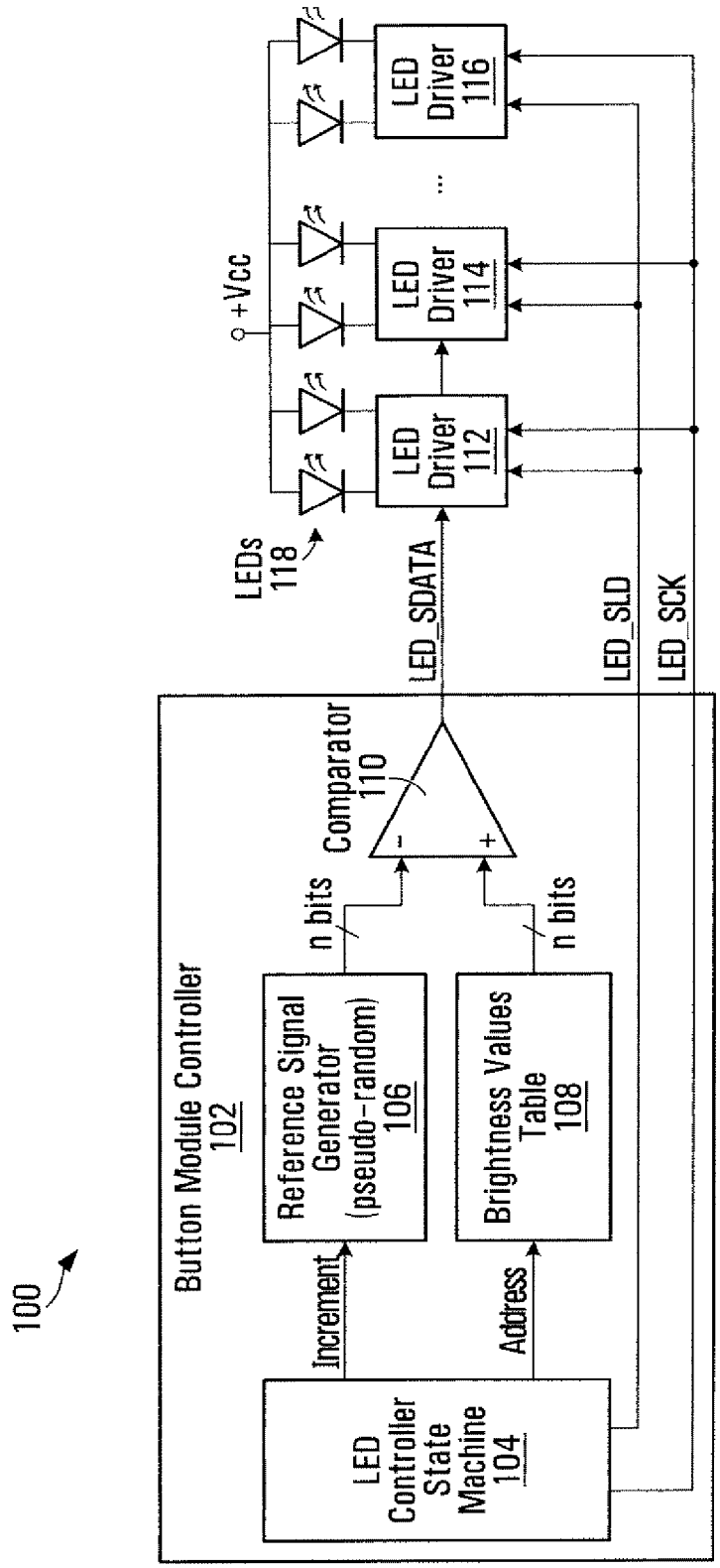
FIG. 9 is a block diagram of a light source driving arrangement that includes a PWM controller according to an embodiment of the invention.

FIG. 9 is a block diagram of a light source driving arrangement 100 that includes a PWM controller according to an embodiment of the invention. In the arrangement 100, a pseudo-random number generator 106, which may have the same range as the binary counter 92 (FIG. 7) is used in a button module controller 102. The button module controller 102 also includes an LED controller state machine 104, a brightness values table 108, and a comparator 110 in the example shown. Outputs from the button module controller 102 are provided to LED drivers 112, 114, 116, each of which drives one or more LEDs 118.

The button module controller 102, as noted above, may be implemented using software, hardware, firmware, or combinations thereof. The LED controller state machine 104, for example, might be implemented in software, whereas the brightness values table 108 is stored in a physical memory device. The reference signal generator 106 could be implemented in hardware using a pseudo-random number generator, and the comparator 110 could similarly be implemented using a hardware component such as a digital comparator.

The LED drivers 112, 114, 116 may also include software, hardware, and/or firmware. Many types of LEDs and associated drivers are commercially available and could be used to implement the LEDs 118 and the drivers 112, 114, 116 in the arrangement 100. Although embodiments of the present invention adjust how the LEDs 118 would be driven by compensating driving parameters, the structure and function of the LEDs and their drivers 112, 114, 116 need not necessarily be changed. For example, the button module controller 102 controls the inputs that are provided to the drivers 112, 114, 116, but the way those inputs are actually handled by the drivers need not change. Thus, embodiments of the present invention may be used with off-the-shelf LEDs and drivers.

It should be appreciated, however, that the arrangement shown in FIG. 9 and the implementation examples described above are intended for illustrative purposes only. Different implementations are contemplated and may be or become apparent to those skilled in the art on the basis of the present disclosure. LEDs 118, for instance, are one example of a light source for which brightness may be controlled using PWM.

Figure 10:
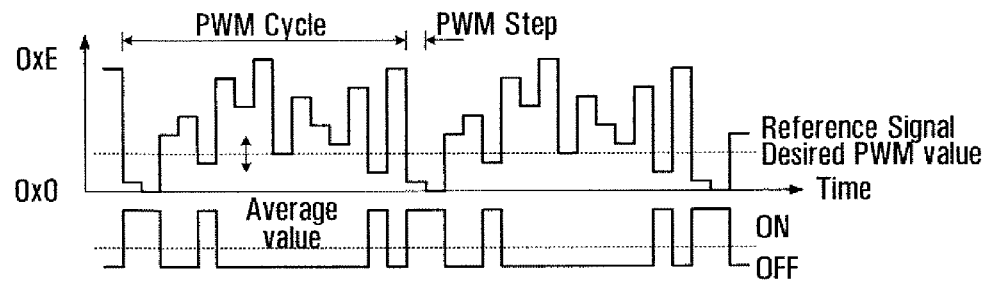
FIG. 10 shows an example plot relating to PWM generation using a controller of the type shown in FIG. 9.

In operation, the output from the reference signal generator 106 is compared in the comparator 110 to a threshold value representing the desired brightness level. The brightness level may be selected from the brightness values table 108 by software implementing the LED controller state machine 104, or otherwise programmed by software for instance. When the pseudo-random number output by the pseudo-random number generator 106 is less than the threshold value, an LED is ON, and otherwise it is OFF. This ON/OFF decision is performed by the comparator 110. This advantageously creates a much higher rate of ON-OFF cycling in the LEDs 118, while still maintaining the same total amount of "ON time" versus "OFF time" per PWM cycle, which in turn reduces the perceived flicker. FIG. 10 shows an example of the resulting PWM waveform, with 4 bits of resolution.

To ensure predictable results, a pseudo-random number generator that is guaranteed to reach every unique number in its range exactly once per PWM cycle may be desirable for implementing the reference signal generator 106. One approach is to use a Linear-Feedback Shift-Register (LFSR). There are many known configurations of this digital logic circuit which meet this criterion. So, for example, an LFSR whose output is fed to the comparator 110 can be used to achieve a reduced-flicker LED PWM waveform.

The arrangement 100 thus represents an example of a PWM controller that includes a pseudo-random number generator 106 and a comparator 110 that is operable to compare a number output by the pseudo-random number generator with a threshold, and to provide an output at a first level or at a second level depending on the comparison. The first and second output levels cause the LEDs 118 to turn ON and OFF.

Improved Generation of Multiple Independent PWM Waveforms

A switcher control panel can have many buttons (hundreds in some cases) and indicators, which means many hundreds or even thousands of light sources to control. Independent brightness control per light source might be desirable for maximum user interface flexibility. However, using dedicated circuitry per light source to generate its PWM waveform and convey brightness control information can lead to a prohibitively expensive and complex system.

According to an aspect of the present invention, a modular design is used. The button module controller 102 stores, in the brightness values table 108, brightness information independently for every light source in a button module, and generates on its own the independent PWM waveforms for them. In the arrangement 100, a small set of light sources, in the form of LEDs 118, is controlled with the serial input LED drivers 112, 114, 116, which are cascaded in a chain to simplify the data and control connections. The button module controller 102 provides these driver chains with the data and control signals required to turn individual LEDs 118 ON or OFF.

Because a target LED PWM frequency might be much smaller than the button module controller 102 or the LED drivers 112, 114, 116 are capable of, the button module controller may time-share the following resources: the reference signal generator 106, the comparator 108, and the LED driver control signals (LED_SCK, LED_SLD). This avoids the cost and complexity of using one dedicated set per LED, and effectively shares data and control paths and signals between the multiple LED drivers 112, 114, 116.

In one embodiment, for every PWM step, the LED controller state machine 104 selects, one by one, brightness values from the table 108 (i.e., one value per LED 118 in a chain), and compares it with the reference signal from the reference signal generator 106. It shifts the result (LED_SDATA) into the serial chain of LED drivers 112, 114, 116 using a serial clock (LED_SCL). Once the comparisons have been made for all LEDs 118 in a chain, the LED controller state machine 104 uses LED_SLD to signal the LED drivers 112, 114, 116 to use the serial data LED_SDATA they received to turn the LED 118 outputs ON/OFF as they are supposed to during the current PWM step. At the end of every PWM step, the LED controller state machine 104 signals the reference signal generator 106 to generate the next code, and repeats the above process. A full PWM cycle is complete when the reference signal generator 106 has covered all of the codes to generate a PWM waveform with the desired resolution or number of bits.

Improved Identification of Key Types

According to yet another aspect of the invention, a small graphical display is placed on a switcher control panel to represent each keyer. This graphical display has inside it the name of the source currently associated with that keyer. A graphical icon is overlaid in this display to indicate the key type, and the icon matches that of the related key type button. The small size of this display allows every keyer to have its own unique display if desired. The operator of the switcher can now see by glancing at the panel surface the source and keyer type associated with every keyer in the switcher without having to press any buttons. This is a significant time saver and improvement in a live broadcasting situation.

In one embodiment, the icon is a triangle that is overlaid on a particular corner of the display to indicate a type of the key. The display itself then provides an indication of the particular key, and the position of the triangle provides an indication of the type of key type.

Figure 11:
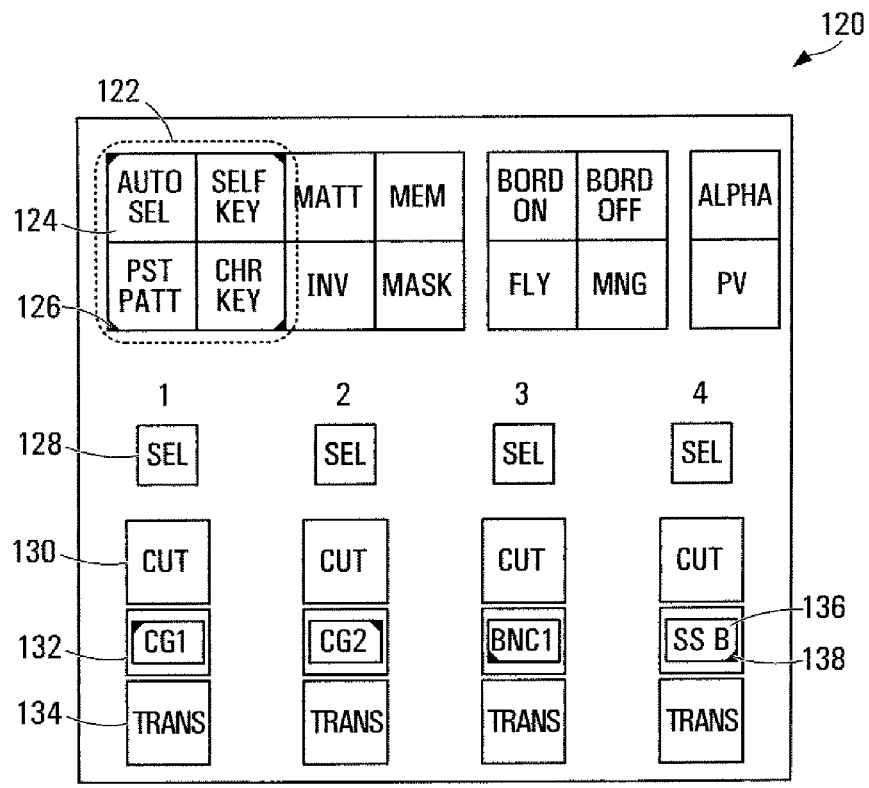
FIG. 11 shows an example keyer module incorporating another embodiment of the invention.

This is shown in FIG. 11, which is an example keyer module 120. The keyer module 120 includes key type selection buttons 122, each of which includes a textual indication 122 of the key type, as well as a key type icon 126. The keyer selection buttons 128 provide for selection of a key type for each of four keyers in the example shown, although other embodiments may include different numbers of keyers. Each of the displays 132 for the four keyers, shown between the "CUT" buttons 130 and the "TRANS" buttons 134, includes not only an indication of the source associated with each keyer, but also an indication of key type. As shown at the bottom right of the Figure, the source indication 136 is in the form of a source name, and the key type indication 138 is in the form of a triangle in the example shown.

The positions of the triangles in the displays 132 are also indexed to the key types of the key type selection buttons 122, which in the example shown include "AUTO SEL" (auto select), "SELF KEY" (a self key mode), "PST PATT" (preset pattern), and "CHR KEY" (chroma key). These and/or other key types may be supported in other embodiments. The further buttons next to the key type selection buttons 122 at the top of FIG. 22 are also provided in the example shown, but need not necessarily be provided in all embodiments.

Modularity and Reconfigurability

A further aspect of this invention uses a modular design to achieve flexibility. At least one button module, and possibly every button module, is designed to be interchangeable in the panel surface. All of the modules may communicate though a daisy-chain of standard cables, for instance. In one possible implementation, common CAT5 cables are used. Special protocols may also be employed to ensure that module type and location of the modules are easily detected and constantly being monitored, to enable plug-and-play type functionality.

There are existing panels that allow users to reconfigure the arrangement of panel modules. Embodiments of the present invention utilize a different approach to facilitate reconfigurability.

For example, according to an aspect of the invention, users/customers can replace any module by just removing a few screws. No other modules will be disturbed during this procedure. A new module, or even different type of module could be dropped in-place. After reboot, software being executed by a switcher frame that is connected to the switcher panel might automatically identify the module type.

Modularity might also enhance the serviceability and reliability of the system. During on-air operation, should one of the modules become defective, an operator could "re-wire" the connections between modules to ensure the rest of the system remains operational. It is also possible to have back-up modules standing by. In such a case, the operator could disconnect the defective module, and reconnect the back-up module, with the ease of using standard cable, in a matter of seconds. Once reconnected, the switcher panel software can once again automatically recognize the new module, and continue normal operation. Additionally, redundant modules could be installed in the panel, providing an active standby, thus allowing an operator to immediately switch over to the redundant standby module should the primary module fail. In this case, no rewiring or reconfiguration of the panel would be required. Such flexibility is not available in current switcher systems.

A modular video production switcher panel might therefore include a panel structure, and a plurality of button modules carried by the panel structure, at least one of the button modules being interchangeable in the panel structure without displacing other button modules in the panel structure. A detector may detect a type of each button module.

Figure 12:
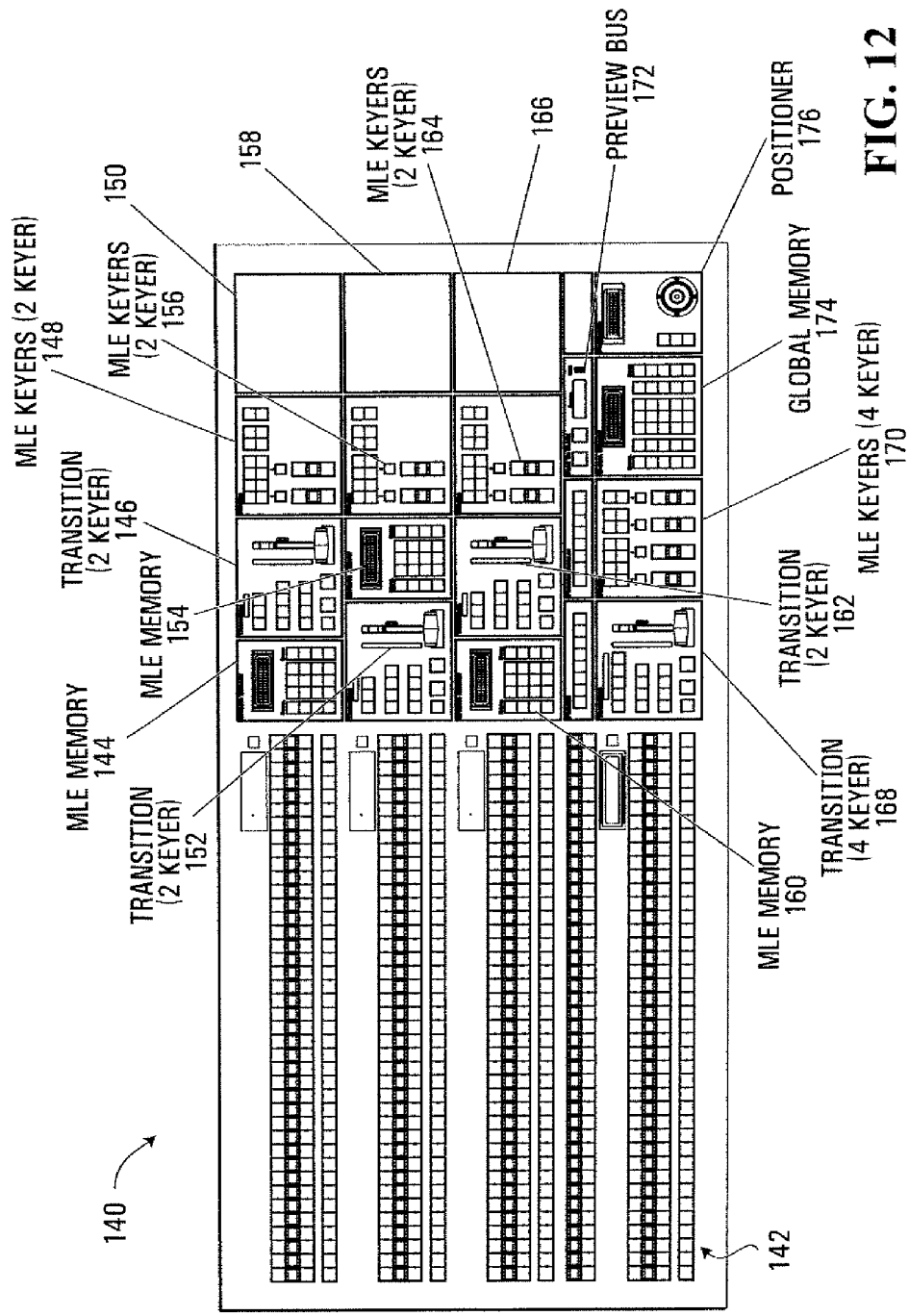
FIG. 12 is a top view of an example video production switcher panel.
Figure 13:
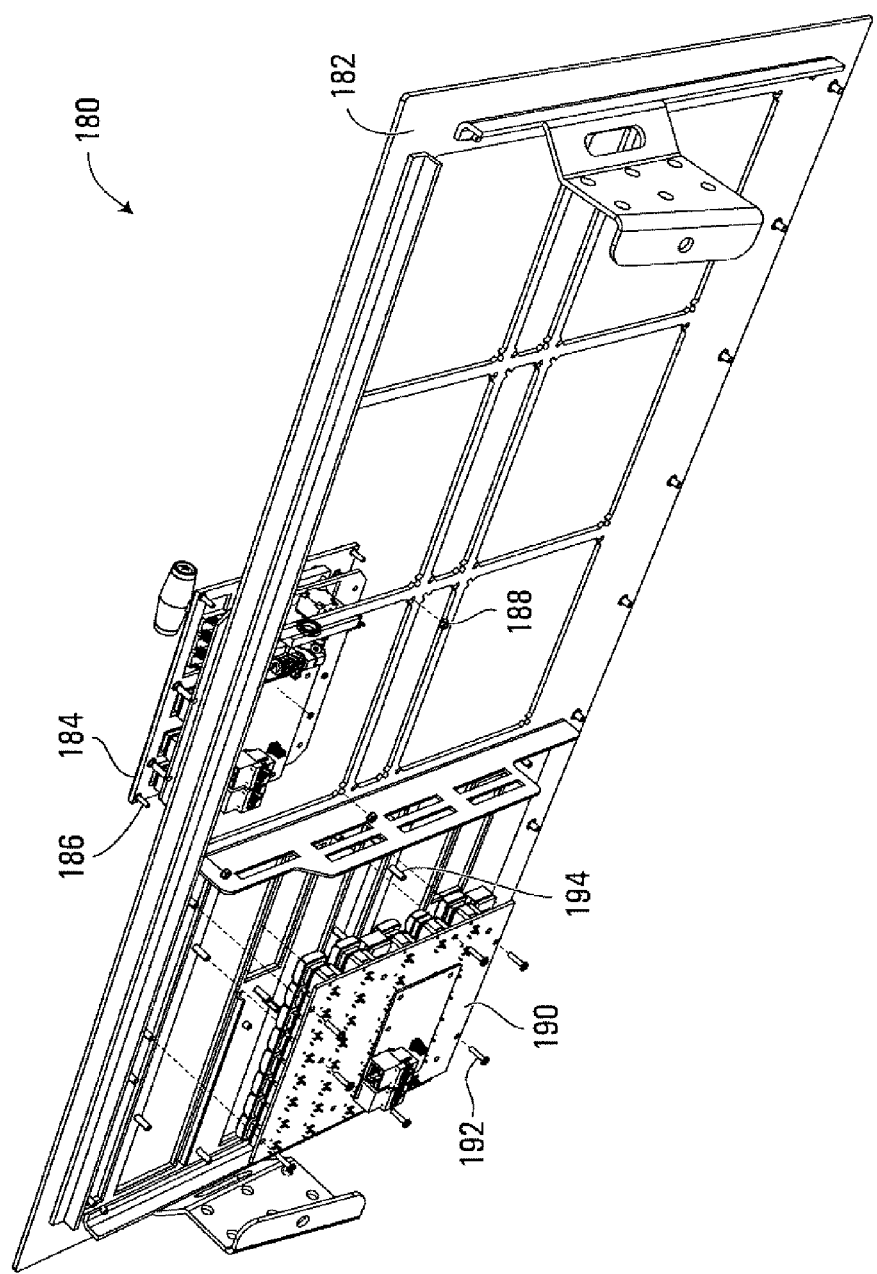
FIG. 13 is a perspective view of an underside of an example video production switcher panel.

The above features relating to modularity can be more fully appreciated with reference to FIGS. 12 and 13. FIG. 12 is a top view of an example video production switcher panel, and FIG. 13 is a perspective view of an underside of an example video production switcher panel.

The switcher panel 140 in FIG. 12 includes various modules, such as crosspoint button modules generally designated 142, MLE memory modules 144, 154, 160, two-keyer transition modules 146, 152, 162, two-keyer MLE keyer modules 148, 156, 164, a four-keyer transition module 168, a four-keyer MLE keyer module 170, a preview bus module 172, a global memory module 174, and a positioner module 176. Blanks which may be removed to accommodate additional modules are designated 150, 158, 166. Other embodiments may include further, fewer, or different modules arranged in a similar or different manner than shown.

FIG. 13 more clearly illustrates how modules may be installed in or removed from a panel structure. In the example panel 180, a transition module 184 carries a metal plate or flange that overlaps an opening in the panel structure 182, and is fastened in place using nuts 188, which engage threaded posts 186 on the module. The crosspoint button module 190 is installed in a different manner, from below the panel structure

182. Screws 192 engage posts 194 to hold the crosspoint button module 190 in place. As those skilled in the art will appreciate, the panel structure 182 may be mounted to a panel stand or pedestal such that it may be rotated about its rear edge. This provides access to the underside of the panel structure for installation or removal of modules such as the crosspoint module 190, which are installed from the bottom.

Other modules may be mounted in a panel using either one of these techniques, and possibly others. The nuts 188 and screws 192 are examples of releasable fasteners that may permit an operator to quickly install and remove modules, but the invention is in no way limited thereto.

Improved Graphic Display—Dual Menu Display

The graphical menu system is broken into multiple distinct and separate regions. Each of these regions is an independent copy of the menu system which may or may not have access to the full menu system. Any hard control surfaces such as buttons and/or programmable knobs associated with these menus could be duplicated to further improve usability. One of these regions is designated as the 'auto follow' menu in some embodiments. When an operator presses a button on a main control panel surface that causes as a secondary effect a menu change, the menu designated as the 'auto follow' menu is the one that changes. In some embodiments, the user is able to copy a menu from one region into another region and/or to swap menus between two regions.

This aspect of the invention has significant and important gains for the operator of a switcher panel. Previously, an operator was able to monitor and control only one aspect of a switcher panel during a live production. Using this aspect of the present invention, the operator can now monitor and control several different aspects of the switcher panel simultaneously, which is crucial in a time sensitive field such as live television.

Thus, a video production switcher panel system may include a display having a first display area for providing access to a full menu system of a video production switcher panel, and a second display area for providing access to at least a portion of the full menu system. The second display area may incorporate user input devices, such as a touchscreen or knobs, that duplicate those of the first display area that are associated with the portion of the full menu system to which the second display area provides access.

Figure 14:
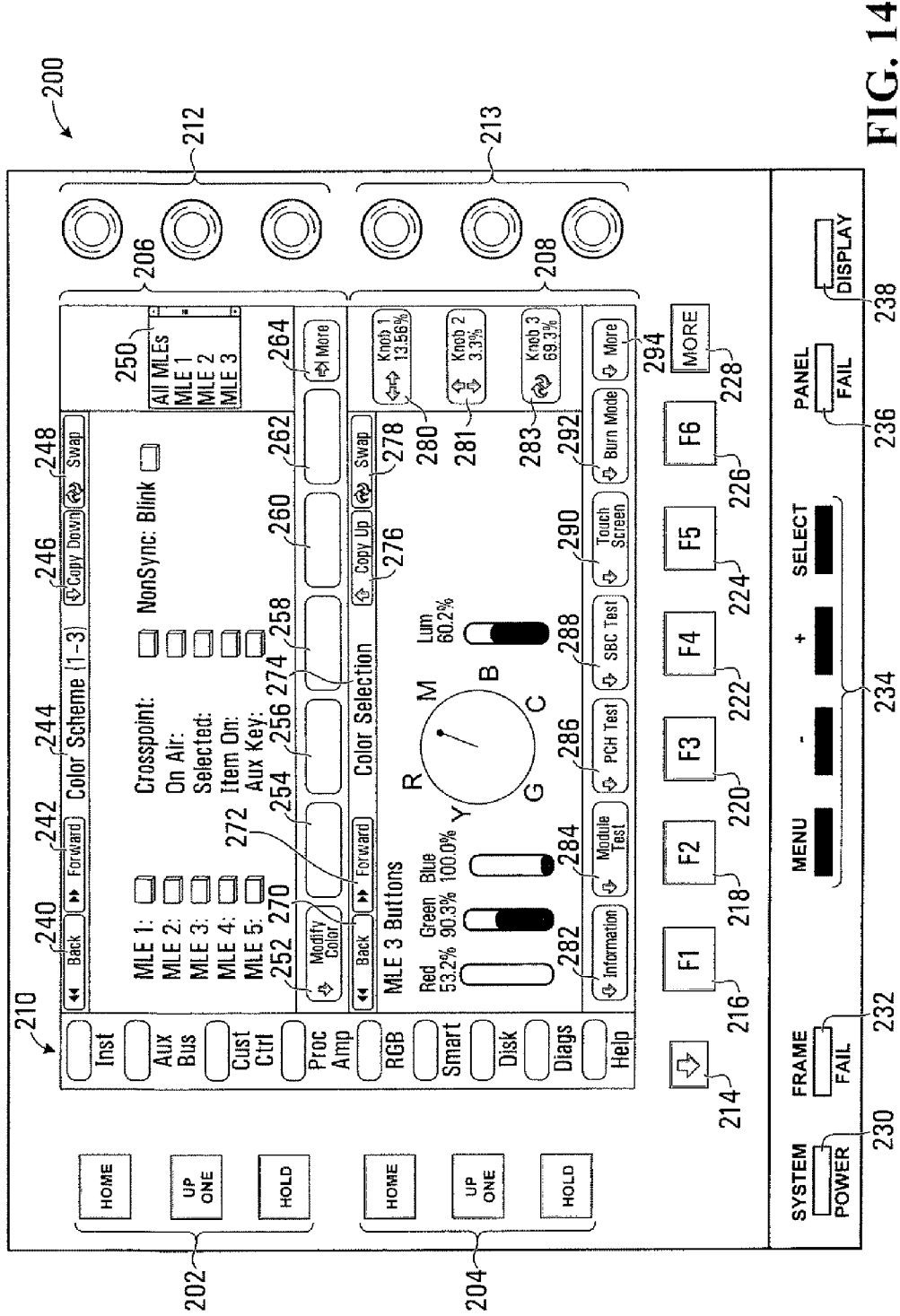
FIG. 14 is a block diagram showing an example dual menu display.

FIG. 14 is a block diagram showing an example dual menu display. The display 200, illustratively touchscreen, includes first and second display areas 206, 208 for providing concurrent access to a menu system. For example, the first display area 206 might provide access to the full menu system, whereas the second display area 208 provides access to a subset of the full menu system. Both display areas 206, 208 might instead provide access to the full menu system so that different parts of the full menu system may be accessed by an operator at the same time. The layout and contents of the display areas, as well as their associated inputs and outputs, are intended solely for illustrative purposes. Other embodiments may vary from the example shown in FIG. 14.

The buttons 202, 204 and the programmable knobs 212, 213 are examples of user input devices that may be duplicated for the first and second display areas 206, 208. The "HOME" buttons at 202, 204 enable an operator to quickly return to a main menu, the "UP ONE" buttons enable an operator to move up one menu in a hierarchical menu structure, and the "HOLD" buttons allow an operator to prevent a menu currently displayed in the associated display area from changing to a different menu. This effectively over-rides the "auto-follow" feature noted above, according to which a currently displayed menu may change based on activities being performed on a switcher panel. For example, without the "HOLD" buttons, if an operator were to press a "Color Background" button on a switcher panel, one of the display areas 206, 208 might automatically change to display a menu to manipulate color parameters. The knobs 212, 213 are programmable in some embodiments, and may be used by an operator to adjust settings in the display areas 206, 208, for example.

Generic functions that are not specific to a particular display area may also be provided in the form of graphical inputs 210 and/or physical buttons 214, 216, 218, 220, 222, 224, 226, 228. The "Help" graphical input at 210 provides access to a user manual in one embodiment.

Each display area 206, 208 includes various graphical inputs and outputs. The display areas 206, 208 include some common inputs and outputs, such as "Back" and "Forward" graphical inputs 240/242, 270/272 for navigation in current menus, respective menu titles 244, 274, "Copy Down" and "Copy Up" graphical inputs 246, 276 for copying a menu from one area 206, 208 to the other area, and "Swap" graphical inputs 248, 278 for switching menus between the display area.

Menu-specific graphical inputs are also provided in the example shown. At 250, the display area 206 lists MLE devices in a switcher panel, a "Modify Color" graphical input is provided at 252, and the "More" graphical input 264 allows multiple pages within one logical menu, in a case where there is insufficient space on the menu to display all relevant information of controls for a particular group of related functions. For example, a menu may show six controls at a time at 252, 254, 256, 258, 260, 262. Controls 1 to 6 might be displayed initially, and the operator can access controls 7 to 12 for that menu through the "More" graphical input 264. The graphical inputs available at 254, 256, 258, 260, 262, but are not used in the menu currently displayed in the display area 206. Various other information relating to MLEs is displayed in the display area 206.

The display area 208 is substantially similar to the display area 206, but includes different information, such as a current color selection an indications at 280, 281, 283 as to how operation of the control knobs 213 will vary color selection. The graphical inputs 282, 284, 286, 288, 290, 292 provide different functions than those in the display area 206. These functions include an "Information" function at 282 to display information about the current MLE 3 button module, a "Module Test" function at 284 to enter a diagnostic menu for button modules, a "PCH Test" function at 286 to enter a diagnostic menu for button module controllers, an "SBC Test" function at 288 to enter a diagnostic menu for a main CPU card, a "Touch Screen" function at 290 to enter a touchscreen diagnostic and calibration menu, and a "Burn Mode" function at 292 to enter a diagnostic "burn-in" mode that exercises all aspects of the switcher panel for production burn-in. The "More" inputs 264, 294 provide similar functions in both of the display areas 206, 208.

At the bottom of the display, indicator lights 230, 232, 236, 238 provide indications of status of system power, a switcher frame to which a switcher panel is connected, the panel to which the display 200 is connected, and the display 200 itself, respectively. The buttons 234 provide for monitor adjustments (i.e., brightness, color, etc.), and may be similar in function to buttons typically found on Liquid Crystal Display (LCD) computer monitors.

What has been described is merely illustrative of the application of principles of embodiments of the invention. Other arrangements and methods can be implemented by those skilled in the art without departing from the scope of the present invention.

For example, a system in which or in conjunction with which embodiments of the invention may be implemented may include other components that have not been explicitly shown in the drawings or described above. A switcher panel itself is typically used to control video production functions, whereas the actual video processing is performed by processors in a frame.

In addition, although described primarily in the context of devices or systems, other implementations of the invention are also contemplated, as methods and/or as instructions, data structures, or both, stored on one or more computer-readable media for instance.

We claim:

1. A video production switcher panel comprising:
   a plurality of user operable buttons;
   a respective multicolor lighting arrangement operable to illuminate each button of the plurality of buttons, each multicolor lighting arrangement comprising red, green and blue Light Emitting Diodes (LEDs); and
   a Pulse-Width Modulation (PWM) controller operable to independently control an intensity of each LED in each multicolor lighting arrangement, to thereby independently control colors of each multicolor lighting arrangement,
   wherein the plurality of buttons comprises calibrated buttons for which the multicolor lighting arrangement has been calibrated, and
   wherein the PWM controller is operable to independently control an intensity of each LED in each multicolor lighting arrangement of each of the calibrated buttons by independently driving each LED in each multicolor lighting arrangement based on its calibration.

2. The video production switcher panel of claim 1, wherein the PWM controller is operable to illuminate groups of the buttons in respective unique colors.

3. The video production switcher panel of claim 1, wherein the PWM controller is implemented at least partially in software.

4. The video production switcher panel of claim 1, further comprising:
   a user input device for receiving from a user a selection of colors for each multicolor lighting arrangement.

5. The video production switcher panel of claim 1, further comprising:
   respective covers releasably secured to one or more of the buttons, each cover having a structure for providing a tactile indication of a delineation between groups of the buttons.

6. The video production switcher panel of claim 5, wherein the structure comprises a dimple on the button cover.

7. A video production switcher panel comprising:
   a plurality of user operable buttons;
   a respective multicolor lighting arrangement operable to illuminate each button of the plurality of buttons, each multicolor lighting arrangement comprising red, green and blue Light Emitting Diodes (LEDs); and
   a Pulse-Width Modulation (PWM) controller operable to independently control an intensity of each LED in each multicolor lighting arrangement, to thereby independently control colors of each multicolor lighting arrangement,
   wherein the plurality of buttons comprises calibrated buttons of a button module, the button module further comprising a memory for storing calibration data associated with the multicolor lighting arrangement of each calibrated button, and
   wherein the PWM controller is operable to independently control an intensity of each LED in each multicolor lighting arrangement by accessing the calibration data stored in the memory and independently driving each LED in each multicolor lighting arrangement based on its calibration.

8. A method of operating a video production switcher panel, the method comprising:
   driving multicolor lighting arrangements, the multicolor lighting arrangements comprising a respective multicolor lighting arrangement to illuminate each button of a plurality of user operable buttons of the video production switcher, each multicolor lighting arrangement comprising red, green and blue Light Emitting Diodes (LEDs); and
   applying Pulse-Width Modulation (PWM) control to independently control an intensity of each LED in each multicolor lighting arrangement, to thereby independently control colors of each multicolor lighting arrangement,
   the plurality of buttons comprising calibrated buttons for which the multicolor lighting arrangement has been calibrated,
   the driving comprising independently driving each LED in each multicolor lighting arrangement based on its calibration.

9. The method of claim 8, wherein the applying comprises applying PWM control to illuminate groups of the buttons in respective unique colors.

10. The method of claim 8, wherein the applying is implemented at least partially in software.

11. The method of claim 8, further comprising:
    receiving from a user a selection of colors for each multicolor lighting arrangement.

12. A method of operating a video production switcher panel, the method comprising:
    driving multicolor lighting arrangements, the multicolor lighting arrangements comprising a respective multicolor lighting arrangement to illuminate each button of a plurality of user operable buttons of the video production switcher, each multicolor lighting arrangement comprising red, green and blue Light Emitting Diodes (LEDs); and
    applying Pulse-Width Modulation (PWM) control to independently control an intensity of each LED in each multicolor lighting arrangement, to thereby independently control colors of each multicolor lighting arrangement,
    the plurality of buttons comprises calibrated buttons of a button module, the button module further comprising a memory for storing calibration data associated with the multicolor lighting arrangement of each calibrated button,
    the driving comprising: accessing the calibration data stored in the memory; and independently driving each LED in each multicolor lighting arrangement based on its calibration.

* * * * *